N. JACKSON.
Vehicle-Fender.
No. 160,679.
Patented March 9, 1875.
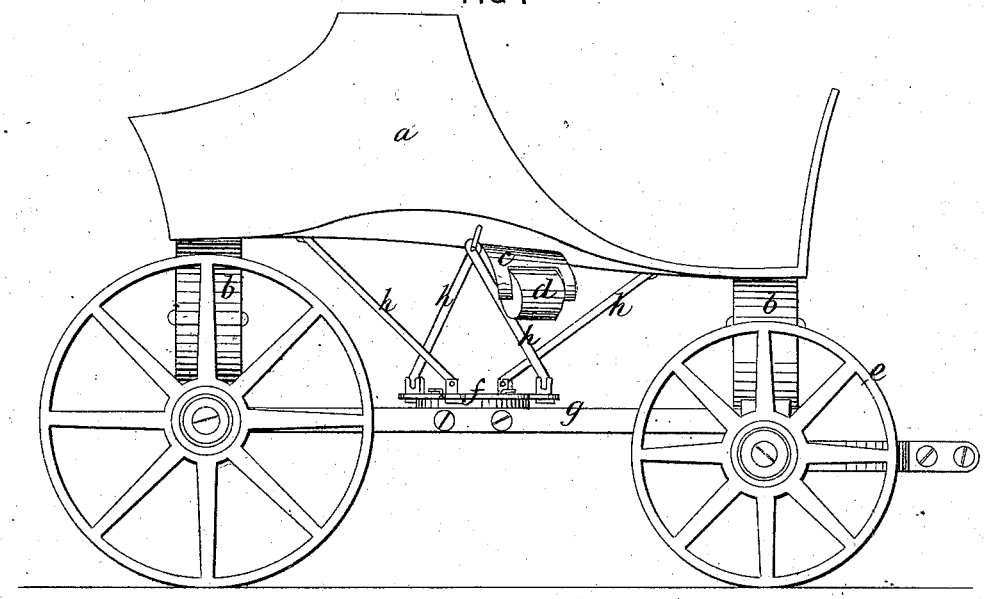
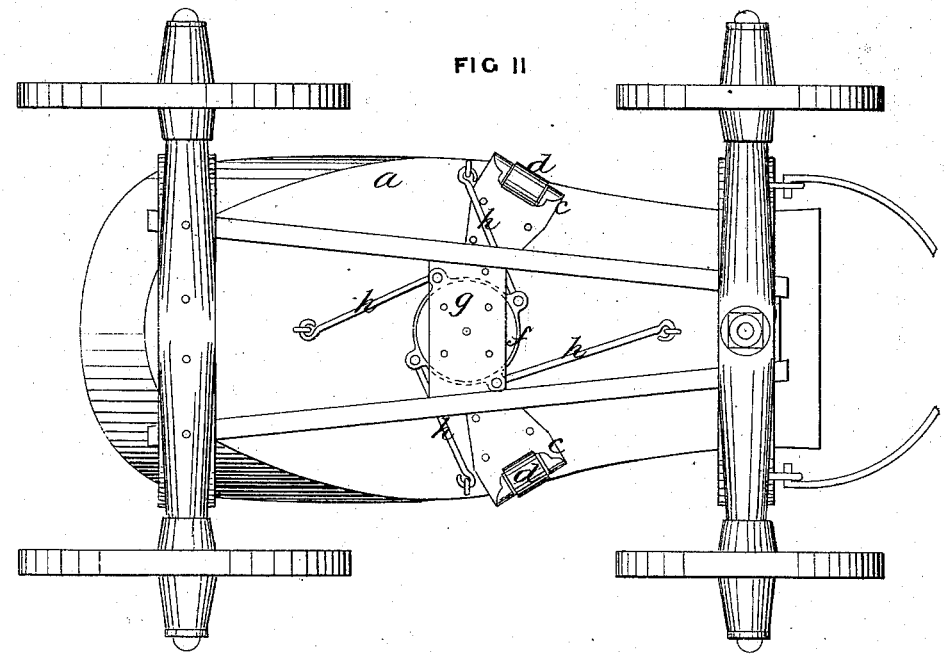
WITNESSES
John E. Laing.
J. T. Rutherford
INVENTOR
Noble Jackson
By Johnson and Johnson
his Attys.
THE GRAPHIC CO.PHOTO.-LITH.39 & 41 PARK PLACE,N.Y.

UNITED STATES PATENT OFFICE.

NOBLE JACKSON, OF HIGGINSVILLE, NEW YORK.

IMPROVEMENT IN VEHICLE-FENDERS.

Specification forming part of Letters Patent No. 160,679, dated March 9, 1875; application filed January 25, 1875.

*To all whom it may concern:*

Be it known that I, NOBLE JACKSON, of Higginsville, in the county of Oneida and State of New York, have invented certain new and useful Improvements in Chafing Device for Wheeled Vehicles, of which the following is a specification:

My improvement consists in the combination, with the body of the vehicle, of the downwardly-projecting bracket and its rubber roller, arranged so as to protect both the body and the equalizing device from injury and strain, and afford a cushion to break the sudden contact and concussion of the wheel against the body.

In the drawings, Figure 1 represents a side elevation of a vehicle embracing my invention, and Fig. 2 a bottom view of the same.

The body $a$ is mounted upon springs $b$. At each side and to the bottom of the body I secure, by brackets $c$, rollers $d$, arranged at an angle to the body, and in positions to receive the action of the front wheels $e\ e$ in turning the vehicle, as shown in Fig. 2. These rollers may be of any suitable material. I prefer rubber, however, and they may be secured in straight or curved brackets. They may be secured to the reaches and accomplish the same results.

When using my equalizer, as described and shown in a patent bearing even date herewith, the chafing device is especially advantageous in protecting the reacting wheel $f$, pivoted to the reach $g$, and the oblique rods $h$, for uniting said wheel to the body, from all injurious action which might be produced by the jumping of the body upon the wheel when the latter is turned short against the body.

I am aware that chafing-rollers have been used to prevent the rubbing of the wheels against the body of the vehicle, and, therefore, do not claim such device, broadly.

I claim—

The combination of the body of the vehicle, the downwardly-projecting bracket $c$, and the roller $d$, to protect both the body of the vehicle and the equalizing device, as set forth.

In testimony that I claim the foregoing I have hereunto set my hand.

NOBLE JACKSON.

Witnesses:
J. LEE TINKER,
GEORGE B. FITCH.